(12) United States Patent
Murphy et al.

(10) Patent No.: US 10,282,992 B2
(45) Date of Patent: May 7, 2019

(54) METHOD AND SYSTEM FOR GENERATING SPACE TO PARK FOR MOTOR VEHICLES

(71) Applicant: Robert Bosch GmbH, Stuttgart (DE)

(72) Inventors: Christopher Murphy, Talheim (DE); Felix Hess, Ludwigsburg (DE); Gerrit Quast, Nuertingen (DE); Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/907,764

(22) Filed: Feb. 28, 2018

(65) Prior Publication Data
US 2018/0253970 A1    Sep. 6, 2018

(30) Foreign Application Priority Data

Mar. 2, 2017    (DE) .......................... 10 2017 203 396

(51) Int. Cl.
*G08G 1/14* (2006.01)
(52) U.S. Cl.
CPC .................................... *G08G 1/141* (2013.01)
(58) Field of Classification Search
CPC .................................................. G08G 1/141
USPC ..................................................... 340/932.2
See application file for complete search history.

(56) References Cited

U.S. PATENT DOCUMENTS

| | | | | |
|---|---|---|---|---|
| 8,947,261 | B1* | 2/2015 | Woodard | G08G 1/144 340/932.2 |
| 9,672,741 | B2* | 6/2017 | Scofield | G08G 1/141 |
| 9,984,572 | B1* | 5/2018 | Newman | G06Q 10/02 |
| 2014/0335897 | A1 | 11/2014 | Clem et al. | |
| 2015/0187213 | A1* | 7/2015 | Amir | G01C 21/3685 340/932.2 |
| 2016/0171785 | A1 | 6/2016 | Banatwala et al. | |
| 2016/0328965 | A1 | 11/2016 | Safer | |
| 2017/0236417 | A1* | 8/2017 | Carrara | G08G 1/141 340/932.2 |
| 2018/0218604 | A1* | 8/2018 | Astigarraga | H04L 67/12 |
| 2018/0225969 | A1* | 8/2018 | Baughman | G08G 1/141 |

FOREIGN PATENT DOCUMENTS

| | | |
|---|---|---|
| DE | 102009028024 A1 | 2/2011 |
| DE | 102015201205 A1 | 7/2016 |

* cited by examiner

*Primary Examiner* — Jack K Wang
(74) *Attorney, Agent, or Firm* — Norton Rose Fulbright US LLP; Gerard Messina (57) ABSTRACT

A method, which can be performed by a system executing instructions on a computer-readable medium, for generating space to park for a motor vehicle includes determining a need for a parking area in a geographic area that includes a roadway, determining a need for road space for the roadway, determining, based on the determined need for the parking area and the determined need for road space, whether a lateral region of the roadway should be set for use as a parking area, and, in response to a positive result of the determination, setting the lateral region of the roadway for use as the parking area.

14 Claims, 2 Drawing Sheets

METHOD AND SYSTEM FOR GENERATING SPACE TO PARK FOR MOTOR VEHICLES

CROSS-REFERENCE TO RELATED APPLICATIONS

The present application claims priority under 35 U.S.C. § 119 to DE 10 2017 203 396.7, filed in the Federal Republic of Germany on Mar. 2, 2017, the content of each of which is hereby incorporated by reference herein in its entirety.

FIELD OF THE INVENTION

The present invention relates to a method for generating space to park for motor vehicles. The present invention further relates to a system for generating space to park for motor vehicles. In addition, the present invention relates to a computer program.

BACKGROUND

The published patent application DE 10 2009 028 024 A1 describes a parking guidance system for navigating a vehicle seeking a place to park to an available parking space.

The published patent application DE 10 2015 201 205 A1 describes a valet parking method.

One of the important challenges of today's towns or cities is to provide adequate space to park. There is also a lasting trend of more and more people moving into metropolitan areas, often with their own vehicle.

This may give rise to an excessively long search for an available parking space for a motor vehicle. As a rule, motor vehicle traffic searching for space to park forms a considerable portion of the overall traffic of the city.

SUMMARY

An object of the present invention is to provide an efficient plan for efficiently generating space to park for motor vehicles.

According to one aspect, a method for generating space to park for motor vehicles includes: determining a need for a parking area for a geographic area including a roadway; determining a need for road space for the roadway; determining whether a lateral region of the roadway should be set for use as a parking area, as a function of the determination of the need for a parking area, and as a function of the determination of the need for road space; and, if so, then setting the lateral region of the roadway for use as a parking area.

According to another aspect, a system for generating space to park for motor vehicles is provided, the system being configured to implement the method for generating space to park for motor vehicles.

According to a further aspect, a computer program is provided, which includes program code for implementing the method for generating space to park for motor vehicles, when the computer program is executed on a computer, for example, on the system.

The present invention is based on the idea that the above-mentioned object can be achieved by making available a lateral region of the roadway for parking motor vehicles, as a function of a need for a parking space, and as a function of a need for road space for the roadway.

In particular, this produces a technical advantage that space to park for motor can be generated efficiently. Therefore, this means, in particular, that a region of the roadway, which is normally available as road space to be travelled on by motor vehicles, is used for parking.

Consequently, additional space to park for motor vehicles can therefore be generated or produced dynamically in a simple and efficient manner, as a function of the specific situation at hand.

This therefore produces the technical advantage that an efficient plan is provided for efficiently generating space to park for motor vehicles.

The lateral region made available as space to park may also be referred to as a generated parking area.

In accordance with the description, a lateral region is delimited on a longitudinal side by an edge of the roadway.

According to one example embodiment, a width of the lateral region is at least 2.5 m, in particular, at least 2.75 m.

According to an example embodiment, a maximum width of the lateral region is 3.75 m.

According to an example embodiment, a width of the lateral region is between 2.75 m and 3.75 m.

In accordance with the description, a parking area refers, for example, to a surface, on which motor vehicles can park or be stopped.

Therefore, this means that according to the description, a parking area is intended for parking. Thus, the parking area is provided for stationary traffic and not for moving traffic.

In the sense of the description, a road space refers, for example, to a surface, on which motor vehicles are intended to travel. Therefore, this means that the road space is not provided for parking, but for motor vehicles to travel on. Thus, the road space is intended for moving traffic, and not for stationary traffic.

According to one example embodiment, it is provided that the roadway be a multi-lane roadway, the lateral region being an outermost traffic lane of the roadway, or the lateral region being a section of an outermost traffic lane of the roadway.

This produces, in particular, a technical advantage that the outermost traffic lane of the roadway can be used efficiently. First of all, it can be used either for moving traffic or, secondly, for stationary traffic.

Consequently, dynamic use of the outermost traffic lane is enabled in an efficient manner.

The outermost traffic lane of the multi-lane roadway denotes the one of the plurality of traffic lanes, which, based on a direction of travel, is provided furthest to the right in the case of driving on the right side, and furthest to the left in the case of driving on the left side.

According to one example embodiment, it is provided that the need for a parking area be a future need at a predetermined time in the future, the need for road space being a future need at the predetermined time in the future.

This produces, in particular, the technical advantage that for the future, it can be determined, in an efficient manner, whether a lateral region of the roadway should be set for use as a parking area.

A further example embodiment provides for the period of time, for which the need for a parking area exists, to be determined; the determination, as to whether a lateral region of the roadway should be set for use as a parking area, being made as a function of the ascertained period of time of the need for a parking area.

A technical advantage of this is that for the future, it can be ascertained efficiently, whether road space is needed for the roadway. Consequently, it can therefore be determined in an efficient manner, whether the traffic situation specifically present allows for a portion of the roadway, in this case, the lateral region, to be made available for use as a parking area.

According to one example embodiment, the period of time, for which the need for road space will be present, is determined; the determination, as to whether a lateral region of the roadway should be set for use as a parking area, being made as a function of the ascertained period of time of the need for road space.

This produces, in particular, a technical advantage that the step of determining, whether a lateral region of the roadway should be set for use as a parking area, can be executed efficiently.

Therefore, if, for example, the need for road space is only for a relatively short time, e.g., 15 minutes, it can be decided that in this case, it is not worth it to make a lateral region of the roadway available as a parking area.

According to a further example embodiment, it is provided that the lateral region be set in such a manner, that an optimum is obtained between the ascertained need for a parking area and the ascertained need for road space.

This generates, in particular, a technical advantage that a balance is efficiently achieved between the need for a traffic jam to prevail on the roadway as little as possible, and the further need that as little motor vehicle traffic as possible searching for parking places is present.

According to one example embodiment, an optimization method or an optimization algorithm is used to determine the optimum.

According to a further example embodiment, the determination of the need for a parking area is made, based on one or more elements selected from the following group of data, the data being assigned to the geographic area and/or a geographic reference area, which is different from the geographic area: parking data, in particular for example, historic parking data, estimated parking data, predicted parking data, actual parking data, and/or query data regarding the need for parking; traffic data, in particular for example, historic traffic data, estimated traffic data, predicted traffic data, and/or actual traffic data; weather data, in particular for example, estimated weather data and/or predicted weather data; traffic jam data, in particular for example, estimated traffic jam data and/or predicted traffic jam data; event data; vacation data; construction site data; and/or an ascertained need for a parking area in the past.

This generates, in particular, a technical advantage that the determination of the need for the parking area can be made efficiently.

In accordance with the description, data can include historical data.

In accordance with the description, data can include predicted data.

In accordance with the description, data can include estimated data.

In accordance with the description, data are assigned, in particular, to the geographic region of, in particular, the roadway.

In accordance with the description, data are assigned, in particular, to a geographic reference area, which is different from the geographic region.

Along the lines of the description, parking data indicate an occupancy state of the parking spaces available within the geographic area, in particular, an occupancy state of parking spaces, which are situated on the roadway.

According to one example embodiment, historical data include one or more ascertained needs for a parking area in the past. According to this example embodiment, for example, past needs for a parking area are used for determining a future need for a parking area.

Query data regarding the need for parking indicate, for example, a number of requests for parking spaces of motor vehicles seeking parking spaces.

Traffic data indicate, for example, a traffic flow within the geographic area, in particular, on the roadway.

According to an example embodiment, traffic data indicate, for example, a traffic flow within the geographic reference area.

According to an example embodiment, actual traffic data are current traffic data, and thus indicate, for example, a current or instantaneous traffic flow.

According to an example embodiment, historical traffic data include one or more ascertained needs for road space in the past.

Traffic data describe, for example, surrounding traffic conditions relative to the roadway, e.g., that there is currently a traffic jam on an access road.

According to an example embodiment, traffic jam data indicate, for example, if and to what extent a traffic jam is present within the geographic area, for example, on the roadway, for example, on a secondary road relative to the roadway, for example, an access road to the roadway.

According to an example embodiment, traffic jam data indicate, for example, if, and to what extent, a traffic jam is present within the geographic reference area.

According to an example embodiment, construction site data indicate, for example, a location of a construction site within the geographic area or a duration of the construction site.

Event data indicate, for example, a date and/or a duration and/or a starting time and/or an ending time of an event, which takes place within the geographic area, for example, on the roadway.

Normally, at the beginning of an event, there is, as a rule, a high volume of traffic in the surroundings of the location of the event. Therefore, this means, for example, that at the start of an event, many motor vehicles of the people attending the event are to be expected.

As a rule, an appropriate number of parking places are needed for these many motor vehicles.

Accordingly, at the end, many motor vehicles of these people leaving the event are to be expected. This being the case, a need for space to park normally decreases at the end of an event.

Consequently, a need for a parking area is present at the beginning of an event.

Therefore, there is normally a lower need for space to park at the end of an event than at the beginning of an event.

Along the lines of the description, vacation data indicate, for example, if vacation is in effect for the geographic area and/or the reference area.

According to an example embodiment, on the basis of, in each instance, one or more elements together, a corresponding need for a parking area is determined; the determination, as to whether a lateral region of the roadway should be set for use as a parking area, being made as a function of the specific, corresponding needs for a parking space.

This produces, for example, a technical advantage that the determination of whether a lateral region of the roadway should be set for use as a parking area can be made efficiently.

According to an example embodiment, it is provided that an average value of the specific, corresponding needs be ascertained; the determination, as to whether a lateral region of the roadway should be set for use as a parking area, being made as a function of the ascertained average value.

This produces, for example, a technical advantage that the determination of whether a lateral region of the roadway should be set for use as a parking area can be made efficiently.

In one example embodiment, it is provided that the corresponding needs be compared, in each instance, to each other, in order to ascertain, in each instance, a difference between the needs; in each instance, the ascertained differences being compared to a predefined difference threshold value; and if one or more of the ascertained differences is equal to or greater than or equal to the respective, predefined difference threshold value, it being definitively stipulated that in this case, only certain data are used in order to determine the need for a parking area.

This produces, for example, a technical advantage that the case, in which the differences are too great, may be treated efficiently.

For example, an operator of the system can stipulate the particular data definitively.

Therefore, this means, for example, that in this case, only historical data, e.g., only the ascertained need for a parking area in the past, are used in order to determine the need for a parking area.

Therefore, this means, for example, that in this case, only historical data, e.g., only the ascertained need for a parking area in the past, and, in addition, weather data and/or traffic jam data and/or vacation data and/or construction site data, are used in order to determine the need for a parking area.

Therefore, this means, for example, that in this case, only current data, in particular, current parking data, are used, in order to ascertain the need for a parking area.

Therefore, this means, for example, that in this case, only current data, in particular, current parking data, and in addition, a trend in the current data, are used, in order to ascertain the need for a parking area.

Therefore, this means, for example, that in this case, only current data, in particular, current parking data, and a buffer requirement (see also the explanations below) for a parking area, are used in order to ascertain the need for a parking area.

Therefore, this means, for example, that in this case, only current data, in particular, current parking data, and in addition, a trend in the current data, and in addition, a buffer requirement (see also the explanations below) for a parking area, are used in order to ascertain the need for a parking area.

Therefore, this means, for example, that in this case, only data, which are assigned to the geographic reference area, are used in order to ascertain the need for a parking area.

Therefore, this means, for example, that in this case, only a combination of historical and current data are used, in order to ascertain the need for a parking area.

Therefore, this means, for example, that in this case, only an average value of the historical data and an average value of the current data are used, in order to ascertain the need for a parking area.

In one example embodiment, it is provided that a buffer requirement for a parking area is added to the ascertained need(s) for a parking space, in order to obtain a greater need for a parking area; the determination, as to whether a lateral region of the roadway should be set for use as a parking area, being made as a function of the greater need(s) for a parking space.

This produces, for example, a technical advantage that a spontaneous or unforeseeable need for a parking space may be efficiently taken into account in the decision as to whether or not a parking area should be generated.

The buffer requirement for a parking area is, for example, a maximum of 30%, for example, a maximum of 20%, in particular, a maximum of 10% of the ascertained need for a parking space.

Therefore, this means, in particular, that according to an example embodiment, a specific buffer requirement for a parking area is added to the above-described, corresponding needs for a parking space, which were ascertained, in each instance, on the basis of one or more elements together, in order to obtain a greater need for a parking area.

In one example embodiment, it is provided that the determination of a need for a parking area include a definitive specification of a need for a parking area, for example, by an organizational unit.

This produces, for example, the technical advantage that the need for a parking area can be ascertained efficiently.

Thus, this example embodiment is based on the need for a parking area being specified definitively. For example, an organizational unit specifies the parking area definitively. The organizational unit can be a promoter of an event. In this case, for example, the organizational unit determines the need for a parking area and transmits this to the system of the present invention. Thus, the organizational unit requests, for example, a particular number of parking spaces in addition to the parking spaces already present within the geographic area.

According to an example embodiment, if the determination as to whether a lateral region of the roadway should be set for use as a parking area yields, that no lateral region of the roadway should be set for use as a parking area, the method ends; the method being restarted after a predetermined time.

This produces, in particular, the technical advantage that space to park can be generated continuously as a function of the specific situation at hand.

In an example embodiment, it is provided that after the lateral region of the roadway is set for use as a parking area, it be checked if the set lateral region should be reset as road space; the parking area being reset for use as road space as a function of a result of the check.

This produces, for example, a technical advantage that road space can be regenerated efficiently.

The checking includes, for example, determining a time when the parking area should be reset as road space; at the ascertained time, the parking area being reset for use as road space.

The checking can include a new determination of a need for a parking area and/or a new determination of a need for road space. Thus, changing needs for a parking area or road space may be taken into account in an efficient manner.

For example, the time when the parking area should be reset as road space is ascertained as a function of the new determination of a need for a parking area and/or as a function of the new determination of a need for road space.

According to an example embodiment, the method for generating space to park for motor vehicles is executed or implemented with the aid of the system for generating space to park for motor vehicles.

In particular, system features follow analogously from corresponding method features, and vice versa.

Therefore, this means, in particular, that the technical functionality of the system follows analogously from corresponding functionality of the method, and vice versa.

The wording, "respective" encompasses, in particular, the wording, "and/or."

In the following, the present invention is explained in greater detail in light of preferred exemplary embodiments. In this connection, the figures show.

DETAILED DESCRIPTION

Figure 1:
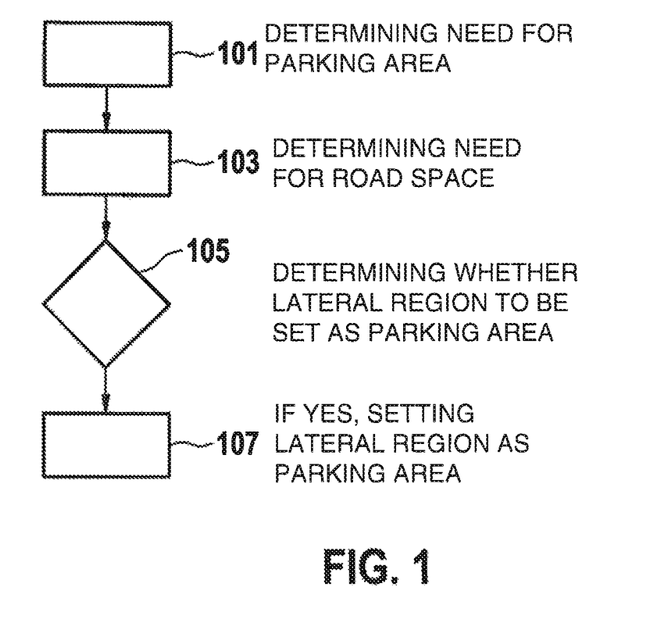
FIG. 1 is a flowchart of a first method for generating space to park for motor vehicles, according to an example embodiment of the present invention.

FIG. 1 shows a flowchart of a first method for generating space to park for motor vehicles, which includes determining 101 a need for a parking area for a geographic area including a roadway; determining 103 a need for road space for the roadway; determining 105 whether a lateral region of the roadway should be set for use as a parking area, as a function of the determination of the need for a parking area, and as a function of the determination of the need for road space; and, if yes, then setting 107 the lateral region of the roadway for use as a parking area.

If, for example, according to step 105, it is determined that no lateral region of the roadway should be set for use as a parking area, then no lateral region of the roadway is set for use as a parking area.

For example, the method can be restarted at step 101 after a predetermined time. According to an example embodiment, the predetermined time is 30 min.

According to an example embodiment, determination 101 of the need for a parking area is made based on one or more elements selected from the following group of data, the data being assigned to the geographic area and/or a geographic reference area, which is different from the geographic area: parking data, in particular, historical parking data, estimated parking data, predicted parking data, actual parking data, query data regarding the need for parking; weather data, in particular, estimated weather data, predicted weather data; traffic jam data, in particular, estimated traffic jam data, predicted traffic jam data; event data; vacation data; construction site data; and ascertained need for a parking area in the past.

The need for a parking area is, for example, a future need for a parking area for a predetermined period of time in the future; according to one specific embodiment, the future need for a parking area being determined based on historical data for a period of time in the past corresponding to the predetermined period of time in the future.

If, for example, the predetermined period of time in the future is a period of time on a weekday, then the need for this period of time is determined, based on a need for a parking area for the same period of time on the same weekday in the past.

For example, a need for a parking area in the past for a particular weekday, e.g., Monday, for a particular period of time, e.g., 9:00 a.m. to 11:00 a.m., is determined; the future need for the particular weekday for the particular period of time being determined, based on the past need for space to park.

For example, an average or mean is determined from historical data, the future need being determined on the basis of the average or mean.

The determination of the average or mean can take into account a trend in the data.

In an example embodiment, the historical data are determined once.

In an example embodiment, the historical data are updated in regular intervals and/or on a running basis, that is, continuously or regularly.

In an example embodiment, the need for a parking area is determined from historical data, plus additional location, temporal and/or situational data for this time.

This means, in particular, that additional data, which can influence the traffic flow and/or the parking spot occupancy, are included in the determination. Examples of such additional data include: weather data, which describe weather; vacation data, which indicate when and how long vacations are and/or which type of vacation (for example: Christmas vacation, Easter vacation or summer vacation); event data, which specify information regarding one or more events; construction site data, which specify information regarding one or more construction sites; holiday data, which indicate a date of a holiday; traffic data, which describe surrounding traffic conditions relative to the roadway (for example, that there is currently a traffic jam on an access road); and parking data, which indicate a state of occupation of parking spaces within the geographic area.

In this context, the need for a parking area is determined, for example, using methods of machine learning (in English, also referred to as predictive data analysis and/or machine learning) and/or of deep learning.

In one further example embodiment, the need for a parking area is determined, based on the current parking data, and based on the trend for a predetermined period of time in the past. This means, for example, that the current occupation states, along with the trend of, for example, the last 30 minutes, are used as a basis and extrapolated for the specified period of time in the future.

In one further example embodiment, a buffer requirement is added to the current occupation states, along with the trend.

An advantage of this is that a sudden and/or unpredictable increase in a need for a parking area may also be acted upon efficiently.

In one further example embodiment, the need for space to park is derived from a need for space to park for a different roadway of the geographic reference area. This is advantageous, for example, if insufficient data or no data from the past are available for the roadway of the geographic area, and/or if the current temporal and/or location and/or situational conditions of the roadway of the geographic area have not yet occurred, that is, are new.

Figure 2:
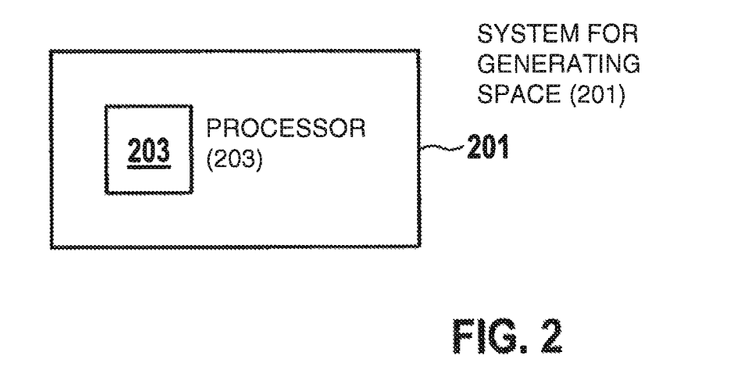
FIG. 2 illustrates a system for generating space to park for motor vehicles, according to an example embodiment of the present invention.

FIG. 2 shows a system 201 for generating space to park for motor vehicles. System 201 is configured to implement the method for generating space to park for motor vehicles.

System 201 includes a processor 203, which is configured to execute steps 101, 103, 105, 107 according to the method shown in FIG. 1. For example, processor 203 is configured to execute a computer program, which includes program code for implementing the method for generating space to park for motor vehicles.

Figure 3:
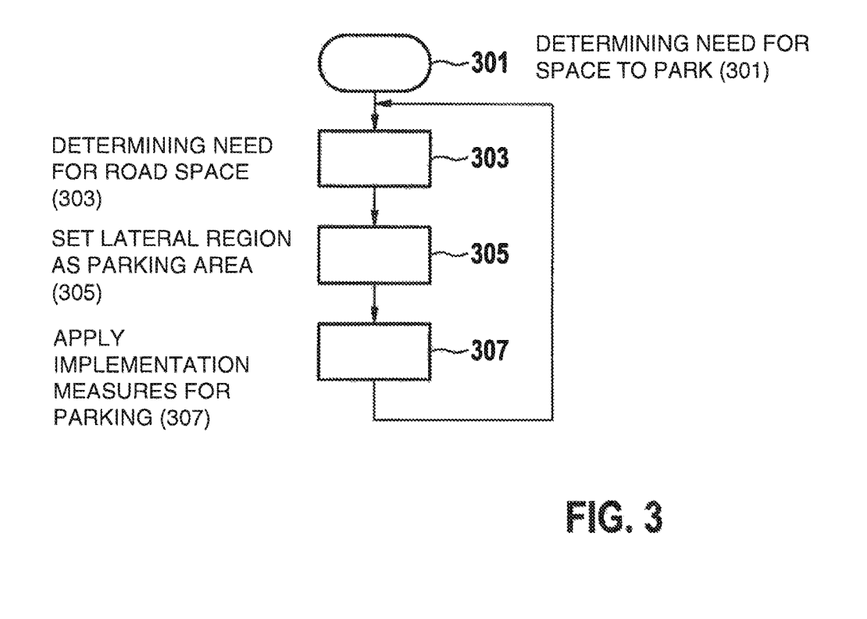
FIG. 3 is a flowchart of a second method for generating space to park for motor vehicles, according to an example embodiment of the present invention.

FIG. 3 shows a flowchart of a second method for generating space to park for motor vehicles. The method starts at block 301, which includes determining a need for space to park for a geographic area including a roadway. Block 303 further includes determining a need for road space for the roadway. Therefore, this means that according to block 303, it is provided that the needs for the space to park and for the road space be ascertained.

According to an example embodiment, at the start 301, it is established that a lateral region of the roadway is still not set for use as a parking area. Therefore, this means that as an initial value for the method, it is provided that, initially, still no space to park be made available or set on the roadway. Therefore, this means, in particular, that at the start 301, the roadway is exclusively specified or made available as road space.

Block 303 includes, for example, a determination as to how much need there is for a parking area and for road space for a predetermined time.

Therefore, this means, for example, that as of a predetermined time in the future, for a predetermined period of time, it is determined how high the need will be for a parking area and how high the need will be for road space for this period of time.

According to an example embodiment, the need for road space and/or the parking area is determined, based on historical traffic data and/or parking data.

According to an example embodiment, the needs are ascertained, for example, based on historical traffic and/or parking data and, in addition, situation-based and/or location-based data, for example, weather data, traffic jam data, event data, and vacation data.

According to an example embodiment, the needs are determined, based on actual traffic data and actual queries regarding the need for parking.

According to an example embodiment, the needs are determined and/or calculated, based on actual traffic data and actual queries regarding the need for parking, of reference areas, for example, reference streets.

According to an example embodiment, the needs are determined from an arbitrary combination of the above-described variants.

According to an example embodiment, the needs for the parking area and the road space are ascertained and/or estimated and/or predicted and/or determined, based on a requirement.

According to an example embodiment, the determination is carried out by a traffic and/or parking management system. According to an example embodiment, such a traffic and/or parking management system includes the system for generating space to park for motor vehicles.

According to an example embodiment, the determination as to which lateral region of the roadway should be used as space to park is made and/or carried out in such a manner, that in light of the needs, an optimum between the need for road space (as small a traffic jam as possible) and the need for a parking area (as little motor vehicle traffic as possible searching for parking spaces) is attained.

For example, optimization algorithms are used for ascertaining the optimum.

According to an example embodiment, the determination and the ascertainment of the needs forming the basis of this determination relate to a defined, and therefore, predetermined period of time (time from a starting time to an ending time) in the future. Therefore, this means, in particular, that the needs are determined for a predetermined period of time in the future, with respect to a predetermined time (starting time). Thus, the lateral region is made available and/or set for use as a parking area for a predetermined period of time from the starting time.

In this manner, it is advantageously ensured that the traffic is granted a certain time, the time up to a predetermined time (starting time), in which the traffic may adjust to the new situation (additionally generated space for parking).

The predetermined time (starting time) may be 30 minutes in the future.

In this connection, it is particularly provided that a parking area set for the first time be increased in size for a defined period of time, in order to adapt the parking area set for the first time, for example, to an increased need for space to park. However, it can be provided that in the event of a decrease in the need for space to park, the parking area set for the first time not be reduced in size for the predetermined time. The reason for this is that motor vehicles will probably park inside the parking area. A reduction in size can then result in parking motor vehicles parking outside of the scaled-down parking area and, therefore, within the road space, which may impede moving traffic.

Therefore, this means, in particular, that if, at a later time, it is determined that the need for space to park has decreased, then a predetermined waiting time is allowed to pass, until the parking area originally set is reduced in size again.

After the needs have been determined in accordance with block 303, then, according to the block 305, as shown in the flowchart displayed in FIG. 3, a lateral region of the roadway is set for use as a parking area, for example, in a manner analogous to the options described above.

Therefore, this means, in particular, that the roadway is split into a section or into a region, which is made available for parking for motor vehicles: the parking area.

The remaining area of the roadway is then designated as road space, within which the motor vehicles are intended to travel. Therefore, the road space is provided for the driving or moving traffic.

The method shown in FIG. 3 further includes a block 307 according to which implementation measures or implementation steps are taken, which implement the setting according to block 305.

For example, according to such an implementation measure, signaling, that the set lateral region is being made available for parking for motor vehicles, is provided.

For example, according to such an implementation measure regarding the signaling, the set lateral region is marked, in order to signal to traffic, where the additionally generated parking area is located. For example, the additionally generated parking area is illuminated in order to mark it.

The signaling can include illuminating the set region.

The signaling includes, for example, activating an optical signaler, in particular, an electronic sign.

The signaling can include sending a message to a network address via a communications network, the message including a position of the set region. The message can also include one or more of the following information items: starting time, at which the set lateral region can be used as a parking area; ending time, up to which the set lateral region may be used as a parking area; beginning of the set lateral region; end of the set lateral region; where within the parking area which motor vehicle may park; remaining time, which indicates when the set lateral region may be used for parking; remaining time, which indicates how long the set lateral region may still be used for parking.

For example, according to an implementation measure as shown in block 307, it is provided that the parking area be monitored. For example, it is provided that parking offenders or illegally parked motor vehicles be removed from the parking area, e.g., towed away.

Further implementation measures according to block 307 include, for example, arranging for electronic transfer of funds, in order to pay a parking fee for a motor vehicle parking within the parking area.

For example, an implementation measure according to step 307 includes checking if stipulated parking times are being observed.

For example, according to an implementation measure as shown in block 307, it is provided that parking inquiries be administered and/or processed. A parking inquiry refers, for example, to a request of a motor vehicle or of a driver of a motor vehicle to park within a parking area. The administering and/or processing of such an inquiry includes, for example, allowing, denying or offering an alternative suggestion, if the inquiring motor vehicle may not, or should not park within the additionally generated parking area.

According to block 307, it is provided, for example, that the method be re-executed, that is, started at block 301, e.g., after expiration of a predetermined waiting time, for example, 30 minutes.

Consequently, e.g., after expiration of the predetermined waiting time, a parking area set once can be adapted to a need for a parking area and/or road space newly ascertained in accordance with the re-execution. Thus, a parking area and/or road space for motor vehicles can be administered dynamically.

For example, based on a need that arises due to an event, it is provided that a regulatory organization stipulates that an additional parking area in the form of a lateral region of the roadway must be generated at a predetermined time and for a predetermined duration as of this predetermined time.

For example, in response to an environmental impact, which is greater than or greater than or equal to a predetermined environmental impact threshold value, it is provided that additional space to park be generated by setting a lateral region of the roadway for use as space to park.

The concept of the present invention provides, for example, that if the need for space to park increases over time, additional space to park be able to be generated by setting a lateral region of the roadway.

According to an example embodiment, if the need for space to park decreases over time, then the lateral region originally set continues to be left unchanged for a predetermined time and only reduced in size again after expiration of the predetermined time, in order to adapt the lateral region to the lower need for space to park.

In this manner, the traffic is advantageously given time to adjust to the new situation. In particular, this gives motor vehicles parking within the parking area the opportunity or possibility to pull out of a parking space and leave the parking area.

Figure 4:
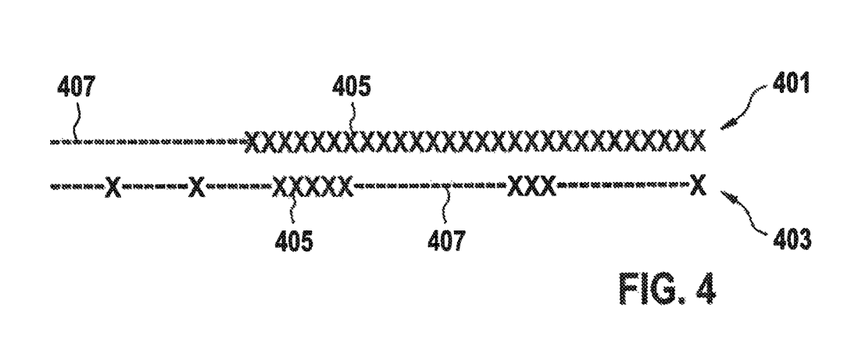
FIG. 4 illustrates an optimized utilization of a generated parking area, compared to a non-optimized utilization of a generated parking area, according to an example embodiment of the present invention.

FIG. 4 shows an optimized utilization 401 of a generated parking area, compared to a non-optimized utilization 403 of a generated parking area.

Motor vehicles, which park within a generated parking area, are represented symbolically by an "x," which is indicated by reference numeral 405. Free spaces between, or in front of, or in back of motor vehicles 405 are represented symbolically by a short dash "-," which is indicated by reference numeral 407.

In optimized utilization 401, motor vehicles 405 are parked as close together as possible.

However, in non-optimized utilization 403, motor vehicles 405 are parked in such a manner, that free spaces 407 are partially formed between motor vehicles 405; the dimensions of some of the free spaces being such, that no other motor vehicles may park in these free spaces 405.

According to an example embodiment, optimized utilization of a generated parking area by parking motor vehicles is effected by assigning a particular position within the generated parking area to motor vehicles, which request a parking space, which means that the utilization is optimized when the requesting motor vehicles park at their assigned positions.

An example of a usage scenario is as follows: automated motor vehicles searching for parking spaces inquire of the system, for example, autonomously, about a parking space within the geographic area. For example, drivers of motor vehicles searching for parking spaces inquire of the system about a parking space within the geographic area. Such inquiries may also be referred to as queries regarding the need for parking. Queries regarding the need for parking include, for example, one or more of the following parameters: position of the parking space needed, duration of use of the parking space, starting time, at which the parking space is needed.

The position of the parking space needed indicates, for example, at least a particular street within the geographic area. The position of the parking space needed indicates, for example, in addition to the particular street, a house number of a house, which is located on the particular street.

Queries regarding the need for parking are transmitted to the system, for example, over a communications network, which includes, for example, a cellular network and/or WLAN network.

Queries regarding the need for parking are transmitted with the aid of a mobile terminal, for example, a cellular phone. For example, an application, which allows queries regarding the need for parking to be sent to the system, is implemented on such terminals.

Queries regarding the need for parking are entered, for example, via a web portal.

Queries regarding the need for parking are sent to the system by the motor vehicle itself, using, for example, a motor vehicle system.

Queries regarding the need for parking are transmitted to the system, for example, using a stationary parking terminal positioned within the geographic area. The driver inputs the driver's desire for a parking space into the parking terminal.

The system determines the need for a parking area within the geographic area based on actual queries regarding the need for parking.

This determination includes, for example, ascertaining a number of free parking spaces in the geographic area and a number of vehicles searching for a parking space in the geographic area. Therefore, this means, for example, that a supply and a demand for parking spaces in the geographic area are determined. The number of vehicles searching for a parking space in the geographic area can correspond to the number of queries regarding the need for parking received by the system over the communications network.

If, for example, the supply exceeds the demand, then it is determined that there is no need for space to park. This being the case, no parking area is generated.

If it is ascertained that the demand exceeds the supply, then it is determined that there is a need for space to park.

The system ascertains, in particular, traffic data, which indicate a traffic flow within the geographic area, in particular, on the roadway. The determination, as to whether a lateral region of the roadway may be set for use as a parking area, is carried out, in particular, based on the traffic data.

Therefore, this means, in particular, that according to this specific embodiment, it is checked if, on the basis of the current traffic situation, it is even possible to set and/or make available a lateral region of the roadway for use as a parking area.

If, for example, the flow of traffic is less than or less than or equal to a specified traffic flow threshold value, it is determined that a lateral region of the roadway may be set for use as a parking area.

If, for example, the flow of traffic is greater than or greater than or equal to the specified traffic flow threshold value, it is determined that no lateral region of the roadway may be set for use as a parking area.

In the case of multiple requests, for example, in the case of two requests for a parking space, that is, if a plurality of parking spaces are requested for the same position, the system checks if it is possible to order these queries regarding the need for parking in such a manner, that all of the requests may be carried out.

If, for example, there are, for house number A, two queries from two motor vehicles regarding the need for parking, where A is a natural number, then, for example, the one motor vehicle is assigned a parking space in front of the house having the house number A. The other motor vehicle is assigned, for example, a parking space in front of the house having the house number A+1.

In one further example embodiment, the needed space to park is additionally optimized by the system with regard to the space or room. This means, for example, that the assignments corresponding to the queries regarding the need for parking are set in such a manner, that the smallest possible parking area is occupied (see also the explanations made above in connection with FIG. 4).

In one further example embodiment, additional motor vehicle data, such as length and/or width and/or height, are additionally transferred to the system, in order to optimize the parking area. This is particularly advantageous, if the generated parking area not having parking space boundary markings is optimized with respect to the actual size of the motor vehicles.

In addition, in one further example embodiment, alternatives for the actual queries regarding the need for parking are ascertained.

Such alternatives include, for example: adjusting the desired times; determining a different or alternative street in the vicinity of the desired position, if the street does not, or cannot offer any space to park at the desired time, that is, if no parking space may be generated on the desired street; and/or determining a different parking area (for example: garage, parking lots).

For example, contact data and motor vehicle identification data are generally sent by the customer and/or by the motor vehicle to the system. This is particularly advantageous, if the requested and then assigned parking space within the generated parking area must also be paid for (thus, deducted).

According to an example embodiment, it is provided that the queries regarding the need for parking be stored for billing purposes.

In an example embodiment, it is provided that a position of a parking space within the generated parking area, which is assigned to a motor vehicle, be stored for billing purposes.

In summary, the present invention provides an efficient plan for generating space to park for motor vehicles, which further allows an efficient, dynamically controlled distribution of the space that is made available by the roadway.

Therefore, this means, in particular, that the roadway is dynamically divided into road space and a parking area.

What is claimed is:

1. A method for generating space to park for a motor vehicle, the method comprising:
    determining, by a processor, a need for a parking area in a geographic area that includes a roadway;
    determining, by the processor, a need for road space for the roadway;
    setting, by the processor, based on the determined need for the parking area and the determined need for road space, a lateral region of the roadway, which is normally available as road space to be travelled on by motor vehicles, for use as the parking area; and
    controlling, by the processor, a device to output a signal marking the set lateral region as having been set for use as the parking area.

2. The method of claim 1, wherein the determination of the need for the parking area is made based on one or more elements selected from the following group of data assigned to at least one of the geographic area and a geographic reference area, which is different from the geographic area: parking data, traffic data, weather data, traffic jam data, event data, vacation data, construction site data, and data regarding a previous ascertained need for a parking area.

3. The method of claim 2, wherein the parking area determined to be needed varies depending on which of the one or more elements the determination of the need for the parking area is made, and the setting of the lateral region includes determining whether the lateral region of the roadway should be set for use as the parking area, which determination varies for different determinations of the needed parking area.

4. The method of claim 2, wherein different parking area needs are determined for different ones of the one or more elements, and an area of the lateral region is set based on an average value of the different determined parking area needs.

5. The method of claim 2, wherein different parking area needs are determined for different ones of the one or more elements, pairs of the different parking area needs are compared to each other to obtain respective need differences, each of the need differences is compared to a predefined difference threshold value, and based on results of the comparisons, a subset of the one or more elements is selected on which to base the setting of the lateral region.

6. The method of claim 1, wherein the determination of the need for the parking area is made based on one or more elements selected from the following group of data assigned to at least one of the geographic area and a geographic reference area, which is different from the geographic area: historic parking data, estimated parking data, predicted parking data, actual parking data, and query data regarding the need for parking.

7. The method of claim 1, wherein the determination of the need for the parking area is made based on one or more elements selected from the following group of data assigned to at least one of the geographic area and a geographic reference area, which is different from the geographic area: historic traffic data, estimated traffic data, predicted traffic data, and actual current traffic data.

8. The method of claim 1, wherein the determination of the need for the parking area is made based on one or more of estimated weather data and predicted weather data assigned to at least one of the geographic area and a geographic reference area, which is different from the geographic area.

9. The method of claim 1, wherein the determination of the need for the parking area is made based on one or more of estimated traffic jam data and predicted traffic jam data assigned to at least one of the geographic area and a geographic reference area, which is different from the geographic area.

10. The method of claim 1, further comprising adding a parking area buffer requirement to the determined need for the parking area to obtain a greater need for a parking area, and determining that the lateral region should be set for use as the parking area based on the determined greater need for the parking area.

11. The method of claim 1, wherein the determination of the need for the parking area is based on a predefined specification of a need for a parking area.

12. The method of claim 1, further comprising:
subsequent to the setting of the lateral region for use as the parking area, determining that the lateral region is to be reset for use as road space, and responsively resetting the lateral region for road space use.

13. A non-transitory computer-readable medium on which are stored instructions, which are executable by a processor, comprising:
a program code arrangement having program code for generating space to park for a motor vehicle, by performing the following:
determining, via the processor, a need for a parking area in a geographic area that includes a roadway;
determining, via the processor, a need for road space for the roadway;
setting, via the processor, based on the determined need for the parking area and the determined need for road space, a lateral region of the roadway, which is normally available as road space to be travelled on by motor vehicles, for use as the parking area; and
controlling, via the processor, a device to output a signal marking the set lateral region as having been set for use as the parking area.

14. A system for generating space to park for a motor vehicle, comprising:
a processor; and
a signaling device;
wherein the processor is configured for generating space to park for a motor vehicle, by performing the following:
determining, via the processor, a need for a parking area in a geographic area that includes a roadway;
determining, via the processor, a need for road space for the roadway;
setting, via the processor, based on the determined need for the parking area and the determined need for road space, a lateral region of the roadway, which is normally available as road space to be travelled on by motor vehicles, for use as the parking area; and
controlling, via the processor, the signaling device to output a signal marking the set lateral region as having been set for use as the parking area.

* * * * *